United States Patent
Edelman

(10) Patent No.: US 6,857,067 B2
(45) Date of Patent: Feb. 15, 2005

(54) SYSTEM AND METHOD FOR PREVENTING UNAUTHORIZED ACCESS TO ELECTRONIC DATA

(76) Inventor: Martin S. Edelman, 11 Lake Ontario La., Morganville, NJ (US) 07751

( * ) Notice: Subject to any disclaimer, the term of this patent is extended or adjusted under 35 U.S.C. 154(b) by 641 days.

(21) Appl. No.: 09/792,045

(22) Filed: Feb. 26, 2001

(65) Prior Publication Data

US 2002/0029347 A1 Mar. 7, 2002

Related U.S. Application Data

(60) Provisional application No. 60/229,934, filed on Sep. 1, 2000.

(51) Int. Cl.[7] .................................................. G06F 1/26
(52) U.S. Cl. ...................... 713/1.55; 713/182; 713/200; 713/201
(58) Field of Search ................................ 713/155, 182, 713/200, 201

(56) References Cited

U.S. PATENT DOCUMENTS

| | | | |
|---|---|---|---|
| 5,502,764 A | 3/1996 | Naccache | 380/23 |
| 5,826,011 A | 10/1998 | Chou et al. | 395/186 |
| 5,844,497 A | 12/1998 | Gray | 340/825.34 |
| 5,933,498 A | 8/1999 | Schneck et al. | 380/4 |
| 5,935,246 A | 8/1999 | Benson | 713/200 |
| 5,940,504 A | 8/1999 | Griswold | 380/4 |
| 5,956,404 A | 9/1999 | Schneier et al. | 380/25 |
| 5,987,134 A | 11/1999 | Shin et al. | 380/25 |
| 6,008,737 A | 12/1999 | Deluca et al. | 340/825.34 |
| 6,009,401 A | 12/1999 | Horstmann | 705/1 |
| 6,009,525 A | 12/1999 | Horstmann | 713/200 |
| 6,021,438 A | 2/2000 | Duvvoori et al. | 709/224 |
| 6,023,766 A | 2/2000 | Yamamura | 713/201 |
| 6,029,145 A | 2/2000 | Barritz et al. | 705/34 |
| 6,035,402 A | 3/2000 | Vaeth et al. | 713/201 |
| 6,047,242 A | 4/2000 | Benson | 702/35 |
| 6,049,789 A | 4/2000 | Frison et al. | 705/59 |
| 6,067,582 A | 5/2000 | Smith et al. | 710/5 |
| 6,073,123 A | 6/2000 | Staley | 705/58 |
| 6,078,909 A | 6/2000 | Knutson | 705/59 |
| 6,087,955 A | 7/2000 | Gray | 340/825.34 |
| 6,101,606 A | 8/2000 | Diersch et al. | 713/201 |
| 6,128,741 A | 10/2000 | Goetz et al. | 713/200 |

OTHER PUBLICATIONS

Charles Cagliostro, "Rosy Outlook Predicted for US Smart Card Market", Card Forum International, pp. 45–47, Nov./Dec. 1999.

Carol H. Fancher, "Smart Cards", Scientific American, pp. 1–10, Aug. 1996.

*Primary Examiner*—Thomas R. Peeso
(74) *Attorney, Agent, or Firm*—Fitzpatrick, Cella, Harper & Scinto

(57) ABSTRACT

A system and method are provided for preventing unauthorized access to electronic data stored on an electronic device. A portable licensing medium is configured to communicate with the electronic device for storing license data. The license data is used to determine whether to allow access to the electronic data. A registration authority communicates with the electronic device. The registration authority has a database of verification data for verifying the license data stored on the licensing medium and provides updated license data to the licensing medium.

113 Claims, 9 Drawing Sheets

SYSTEM AND METHOD FOR PREVENTING UNAUTHORIZED ACCESS TO ELECTRONIC DATA

This application claims the benefit of U.S. Provisional Application No. 60/229,934, filed Sep. 1, 2000.

BACKGROUND OF THE INVENTION

1. Field of the Invention

The present invention relates generally to preventing unauthorized access to electronic data, such as for example computer software, music, movies, e-books, and the like. More specifically, the present invention relates to an access authorization system and method in which a client electronic device communicates with a licensing medium that stores license data identifying the electronic data to which the user is authorized to have access. The client electronic device also communicates with a central registration authority that contains a database used to verify the license data.

2. Related Art

Electronic devices, both wired and wireless, such as personal computers, handheld computing devices, personal data assistants, cellular telephones and CD and DVD players, are ubiquitous. These devices perform an increasing array of functions, including business, entertainment and educational type functions, just to name a few.

The common link between these electronic devices is their use of electronic data to perform their respective functions. The electronic data may be used to control the device itself, such as, for example, when the data comprise a computer software program. Alternatively, the electronic data may be intellectual content that is manipulated by these devices, such as, for example, when the data comprise music, movies, e-books, database information, or other forms of data that are privileged, copyrighted, proprietary or otherwise protected from unauthorized access.

In either case, the electronic data are valuable because of the time and effort that was expended in their creation. For example, a computer software program typically is the product of a labor-intensive development that involves software engineers, programmers, artists and marketers, just to name a few. Similarly, music, movies and e-books typically are the product of creative endeavors of artists and authors. In addition, the creation of all of these forms of electronic data may involve extremely costly production and marketing efforts.

By contrast, copying such electronic data typically requires very little time, effort and money. Consequently, unauthorized copying and distribution of electronic data is rampant. With regard to personal computer software, for example, it is estimated that 30% of software used in the United States is unlicensed and therefore unauthorized.

In certain foreign nations, in excess of 95% of the software programs in use are unauthorized copies, which were created in the United States or elsewhere and sold at a small fraction of their U.S. retail price. In some of these foreign nations, software piracy has become a large industry. This widespread unauthorized use of software and other electronic data has a potential chilling effect on the artists, entrepreneurs, and others who would create it.

The law, of course, provides some mechanisms for preventing or discouraging such piracy. Copyright protection, for example, is one of the most common legal means of protecting electronic data. Patent protection, also, is increasingly being used to protect some electronic data, particularly various aspects of computer software. Contractual provisions, such as licenses, are widely used as an adjunct to other forms of protection.

The right to use software under a license agreement may be restricted to a single user or a single computer. Where use on more than one computer is contemplated, such as in a local area network (LAN), the license may allow use on a number of computers. This sort of multiple computer license is often referred to as a site license, since it typically is implemented to allow several computers at a particular site to run the licensed software.

However, the effectiveness of these legal and contractual measures has been inadequate. Accordingly, vendors of electronic data have turned to technological means of protecting their intellectual content.

For example, licensed electronic data, such as computer software, may be protected from unauthorized use and/or copying by using a protection scheme that requires the user to register the licensed software with the vendor. Generally, such protection schemes use a registration program that is included with the software and executes upon installation of the software.

The registration program requires the user to enter a code sequence that was provided by the vendor with the software, e.g., printed on a CD-ROM case. The code sequence is checked by the registration program to determine whether it is valid. If it is valid, the registration program enables the user to use the software.

Conventional registration programs determine the validity of the code sequence using mathematical algorithms. Typically, such algorithms are simply the inverse of the algorithm initially used by the vendor to generate the set of valid code sequences that are distributed with the software.

While such conventional schemes do provide a rudimentary measure of security, they are far from unbeatable. In fact, such security systems are often thwarted by pirates who ascertain the algorithms for determining validity by analyzing the code sequences that they generate. Once an algorithm has been ascertained, it may be used by unauthorized users to generate valid code sequences for the licensed software. These valid code sequences or the algorithm itself, which is known as a keygen, then may be distributed widely to large numbers of unauthorized users. Indeed, keygens for many commercially successful licensed software products are freely available on the Internet.

Some vendors have attempted to improve upon the code sequence protection scheme by requiring users to enter certain personal information, such as the user's name and telephone number. This information is transmitted to the vendor where it is encoded and used in the code sequence generation process. The code sequence is sent back to the user, who uses it to unlock the software. However, this approach, like the code sequence approach discussed above, is also based on an ascertainable mathematical algorithm and therefore also may be circumvented for the same reason.

Another approach to preventing unauthorized access to licensed software is to require the user to have hardware keys, which are referred to as dongles, connected to the user's computer in order to use the licensed software. Typically, dongles are connected to the input/output (I/O) port of a computer.

There are numerous disadvantages in the use of dongles. For example, each piece of licensed software requires a separate dongle, but computers typically have a limited number of I/O ports. Consequently, a number of dongles may have to be connected to a single I/O port if several pieces of license software are to be used. This may result in interference between the attached dongles, which may cause the dongles or the associated software to fail. Another disadvantage is that dongles may be easily lost or stolen. Software licensors typically replace lost or stolen dongles for a nominal fee, which may allow unauthorized users to easily obtain dongles.

Another approach to preventing unauthorized use and/or copying of licensed software is to require the user to have a licensing module connected to the user's network in order to use the licensed software. This approach is discussed in U.S. Pat. No. 6,101,606 (Diersch et al.). The module may contain an identification code and other licensing information. The licensed software periodically communicates with license management software on a network server. The license management software, in turn, communicates with the licensing module to determine whether a valid module is connected to the network.

There are several disadvantages to the licensing module approach. The licensing module contains a fixed identification code that may be ascertained through analysis of the module. Ascertaining the identification code would allow an unauthorized user to duplicate the module. Another disadvantage of the licensing module approach is that the licensing module is vulnerable to tampering. For example, a user may seek to increase the number of authorized users for a site licensing by changing licensing data stored in the module.

Yet another disadvantage of the licensing module approach is that authorized users are unable to use the licensed software on computers that are not connected to the single, fixed network. For example, an authorized user would not be able to use the licensed software on a laptop computer, personal digital assistant or other type of mobile computing device.

Another approach to preventing unauthorized use and/or copying of licensed software is to provide license management software that is installed on the user's server, as discussed in U.S. Pat. No. 6,049,789 (Frison et al.). The management software transmits pay-per-use license requests for the licensed software to a central license management system. The central license management system grants pay-per-use licenses to the user upon receiving these requests and maintains billing records.

This approach, however, suffers from the disadvantage that the user must be connected to the central license management system in order for a pay-per-use license to be granted. Consequently, as in the case of the licensing module, the software cannot be easily used on mobile electronic devices such as a laptop or personal data assistant.

There is a need, therefore, for a system and method for preventing unauthorized access to electronic data that takes an entirely fresh approach and overcomes the drawbacks of the conventional techniques.

SUMMARY OF THE INVENTION

The present invention generally provides a novel system and method for preventing unauthorized access to electronic data.

One aspect of the present invention provides a system and method for preventing unauthorized access to electronic data stored on an electronic device. A portable licensing medium is configured to communicate with the electronic device for storing license data. The license data is used by the electronic device to determine whether to allow access to the electronic data. A registration authority is configured to communicate with the electronic device. The registration authority has verification data for verifying the license data stored on the licensing medium. The registration authority provides updated license data to the licensing medium.

Embodiments of the present invention may include one or more of the following features. The electronic device may verify the validity of the licensing medium by comparing the license data to the verification data of the registration authority.

The licensing medium may store a license data message digest produced by performing a hash of the license data. The verification data may include a copy of the license data message digest. The electronic device may verify the validity of the licensing medium by comparing the license data message digest to the copy of the license data message digest in the verification data of the registration authority.

The license data message digest may be encrypted with a private key associated with the registration authority. The private key may be one of a number of private keys associated with the registration authority. The verification data may include a copy of the encrypted license data message digest. The electronic device may verify the validity of the licensing medium by comparing the encrypted license data message digest to the copy of the encrypted license data message digest in the verification data of the registration authority.

The electronic device may verify the validity of the licensing medium by decrypting the license data message digest read from the licensing medium using a public key associated with the registration authority, generating a message digest by performing a hash on the license data read from the licensing medium, and comparing the decrypted message digest to the generated message digest.

The electronic device may send registration information to the registration authority. The registration information may include a random identifier associated with the electronic data. The verification data stored in the registration authority database may include a list of authorized identifiers that allow access to the electronic data. The registration authority may provide updated license data to the licensing medium when the identifier sent with the registration information corresponds to one of the authorized identifiers.

The licensing medium may be a smart card having a memory. The smart card also may have a microprocessor. The smart card may decrypt a first message digest received from the registration authority using a public key associated with the registration authority, generate a second message digest by performing a hash on updated license data received from the registration authority, and compare the first message digest to the second message digest. The licensing medium may also be a memory stick, random access memory, or a computer disk (e.g., optical, magnetic, or electronic). The licensing medium may be a memory installed in a cellular telephone that may or may not be removable.

The license data may include a licensing medium expiration date determined by a configurable time period during which the licensing medium is valid. The licensing medium expiration period may be, e.g., thirty days.

The license data may include a software license expiration date determined by a configurable time period during which access to the electronic data is allowed. The software license expiration period may be, e.g., one day or thirty days.

The license data may include a software security expiration date determined by a configurable time period during which access to the electronic data is allowed. The software security expiration period may be, e.g., thirty days.

Another aspect of the present invention provides a system and method for preventing unauthorized access to electronic data stored on an electronic device. A portable licensing medium is configured to communicate with the electronic device for storing license data. The license data is used to determine whether to allow access to the electronic data. A registration authority is configured to communicate with the electronic device. The registration authority has a first database of verification data for verifying license data stored in a second verification database. A license manager is configured to communicate with the electronic device and the registration authority. The license manager has a second database of verification data for verifying the license data stored on the licensing medium. The license manager provides updated license data to the licensing medium.

Embodiments of the present invention may include one or more of the following features. The electronic device may verify the validity of the licensing medium by comparing the license data to the second database of verification data of the license manager. The license manager may verify the validity of the second database of verification data by comparing it to the first database of verification data of the registration authority.

The licensing medium may store a license data message digest produced by performing a hash of the license data. The second database of verification data may include a copy of the license data message digest. The electronic device may verify the validity of the licensing medium by comparing the license data message digest to the copy of the license data message digest in the second database of verification data of the license manager.

The license data message digest may be encrypted with a private key associated with the registration authority or the license manager. The private key may be one of a number of private keys associated with the registration authority or the license manager. The second database of verification data may include a copy of the encrypted license data message digest.

The electronic device may verify the validity of the licensing medium by comparing the encrypted license data message digest to the copy of the encrypted license data message digest in the second database of verification data of the license manager.

The electronic device may verify the validity of the licensing medium by decrypting the license data message digest read from the licensing medium using a public key associated with the registration authority, generating a message digest by performing a hash on the license data read from the licensing medium, and comparing the decrypted message digest to the generated message digest.

The license manager may send site license registration information to the registration authority. The site license registration information may include a random identifier associated with the electronic data. The verification data stored in the registration authority database may include a list of authorized identifiers that allow access to the electronic data. The registration authority may provide updated verification data to the license manager when the identifier sent with the registration information corresponds to one of the authorized identifiers.

The license manager may communicate with the registration authority to verify that the verification data stored by the license manager corresponds to the verification data stored by the registration authority.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Figure 1:
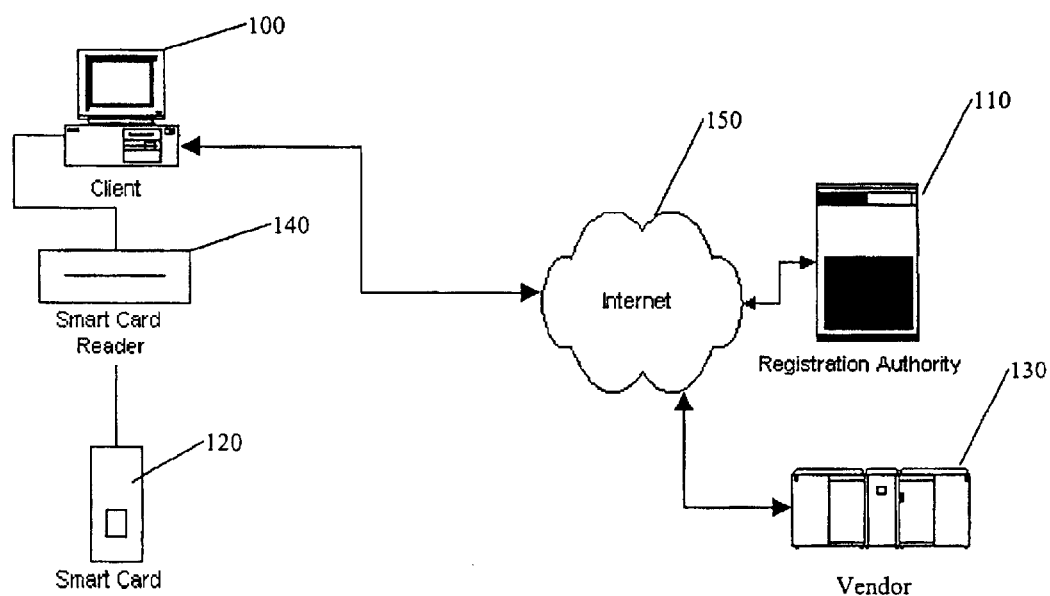
FIG. 1 is a block diagram of a system for protecting licensed electronic data used by a client computer.

FIG. 1 depicts a block diagram which illustrates in general terms an embodiment of the present invention. In FIG. 1, a personal computer 100, referred to as the client device, may be configured to use licensed computer software provided by a third-party vendor.

Of course, the present invention is not limited to preventing unauthorized access to computer software on personal computers. Other examples of electronic devices that use licensed electronic data include DVD players, handheld computing devices, personal data assistants (PDAs), cellular or personal communication system (PCS) telephones, intelligent appliances (e.g., refrigerators and heating and cooling systems), internet appliances, etc. Other examples of licensed electronic data include computer software, music, movies, e-books, artwork, privileged data (such as databases, privileged publications and communications), etc. Still other examples of both exist as well.

In general terms, the protection system of the present invention uses a registration authority 110 that determines whether a given user is authorized to have access to a given piece of electronic data. As used herein, the phrase "access to electronic data" and its derivatives (e.g., "accessing electronic data") refers broadly to any type of manipulation of electronic data, including (but not limited to) installing, using, copying, inputting, outputting, reading, writing, deleting, viewing, playing, storing, moving, processing, etc. The registration authority 110 may be implemented as a server on a network, operated under the control of a software protection administrator. The software protection administrator maintains the registration authority 110 in cooperation with the vendors of the electronic data.

As part of such a protection system, the vendor may require the user to install a client program provided by the software protection administrator. The client program installed on the client computer 100 communicates with a licensing information storage medium 120, referred to as the licensing medium, and the registration authority 110. Alternatively, the client program may be embedded in the electronic data and may be executed in the course of accessing the electronic data, rather than being installed separately by the user. The registration authority 110, in turn, communicates with the vendor 130, which maintains a database of valid licenses issued for the electronic data.

The licensing medium 120 is a portable component that contains information concerning the software or other licensed electronic data that the user is authorized to access. When a user seeks to access a vended piece of electronic data, the client program communicates with the licensing medium 120 to verify that the user is authorized to access the electronic data.

In general, the licensing medium 120 may be any type of portable electronic data storage medium that has a unique, unalterable serial number or other form of identification that can be transmitted electronically. Examples include smart cards, memory sticks, magnetic strip cards, floppy disks and other removable computer storage media. The licensing medium 120 and the electronic device that uses the licensed electronic data need not have a wired connection. A wireless connection, e.g., an infrared or radio frequency (RF) link, may be used.

In certain types of electronic devices, the licensing medium 120 may be configured so that it is not removable, e.g., certain types of cellular phones, hand-held computing devices, or cable television control boxes. For example, the licensing medium may be an internal random access memory (RAM) installed in a cellular phone. It is also contemplated that the invention can include stationary devices, e.g., refrigerators or other household appliances, that have a licensing medium that is not removable.

Figure 2:
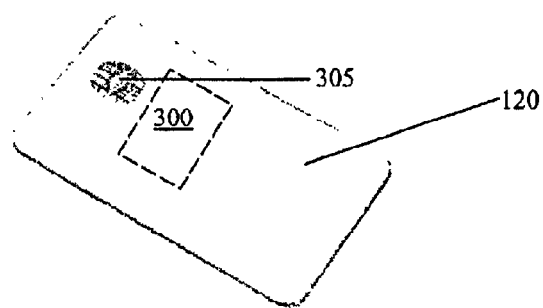
FIG. 2 shows a smart card with surface contacts.

In the example of FIG. 1, a smart card is employed as the licensing medium. As shown in FIG. 2, a smart card 120 is a plastic card containing a microchip 300. Contacts 305 for the microchip 300 are formed on the surface of the card 120 to provide data input and output and power supply input.

Figure 3:
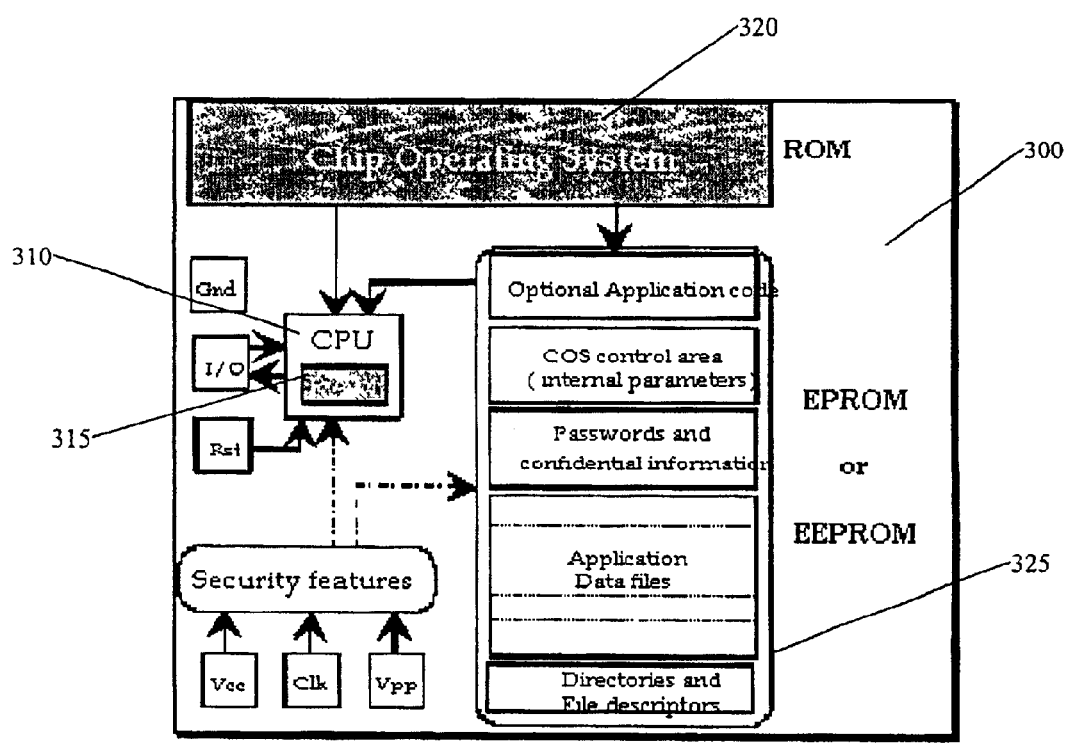
FIG. 3 is a block diagram of the internal microchip of the smart card.

As shown in FIG. 3, the microchip 300 includes a central processing unit (CPU) 310 that has an associated random access memory (RAM) 315, although a smart card without a CPU also may be used. The RAM 315 is used to temporarily store information during processing while power is being supplied to the card. A read only memory (ROM) 320 permanently stores the microchip operating system. An erasable programmable read only memory (EPROM) 325 stores application code and data, such as the licensing information discussed above.

Referring again to FIG. 1, the client program accesses the smart card 120 using a smart card reader 140 connected to the client computer 100. The smart card 120 contains licensing information that indicates to the client program which software the user is authorized to access. The licensing information may include other information as well, such as for example time-stamps that indicate when the license for each authorized software expires.

The smart card may be a dedicated smart card that is specifically provided for use as a licensing medium. Alternatively, a generic smart card having other functions, e.g., a credit card, may be adapted for use as the licensing medium. In such a case, the smart card would function both for the original purpose and as the licensing medium.

The registration authority 110 is a remote server that maintains a licensing database containing information for all of the licensing media 120 authorized by the software protection administrator and all of the software licenses authorized by the software vendors 130. The client program communicates with the registration authority 110 to perform a number of functions associated with the operation of the protection system. The client program may communicate with the registration authority 110, for example, using the Internet 150.

For example, the client program may verify the validity of the smart card 120 by communicating with the registration authority 110. As a further example, the client program communicates with the registration authority 110 to change the contents of the smart card 120 to add, remove, or modify the user's access to the software. The contents of the smart card 120 also may be changed in order to transfer a license to access the software from one smart card to another or to update time-stamps that indicate when authorization to use the software or the licensing medium itself expires.

Figure 4:
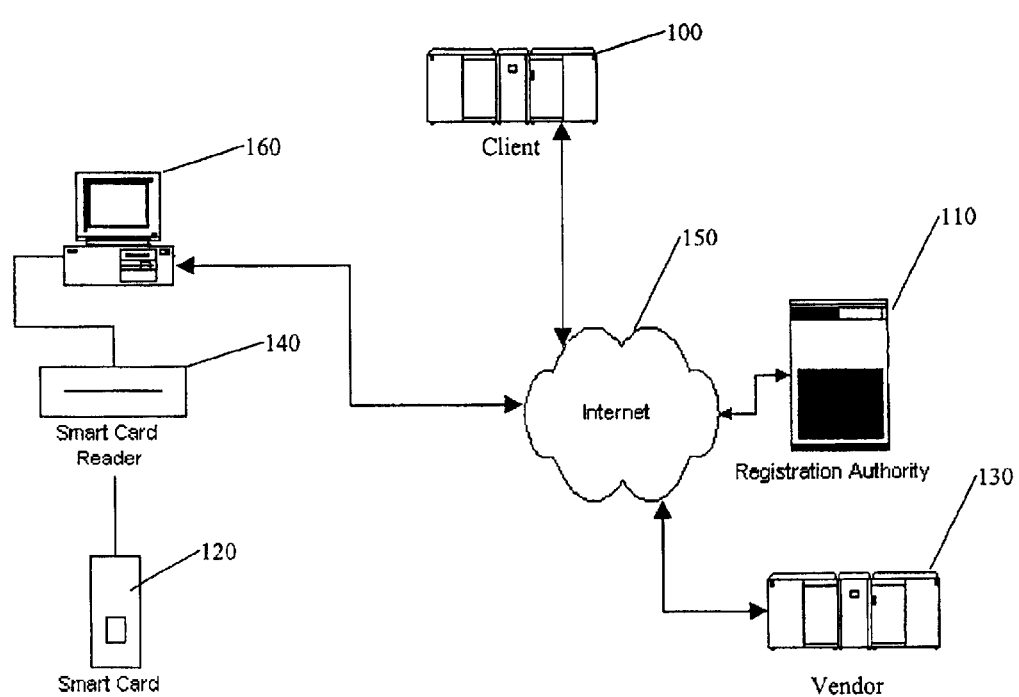
FIG. 4 is a block diagram of a system for protecting licensed electronic data used by a remote client computer.

As shown in FIG. 4, the licensing medium and electronic device need not be co-located. For example, the licensing medium, e.g., a smart card 120, may be connected to the user's computer 160, which, in turn, is connected to the client device 100 through the Internet 150. The client device 100 may be a remote server running licensed software or hosting a proprietary or commercial database that the user is authorized to access.

As a further example, the client device 100 may be a remote Internet web server containing computer aided drafting (CAD) files, such as building construction plans. In such a case, the smart card 120 effectively acts as a gatekeeper to allow authorized users, e.g., architects, builders, and contractors, to have access to the building plans.

Figure 5:
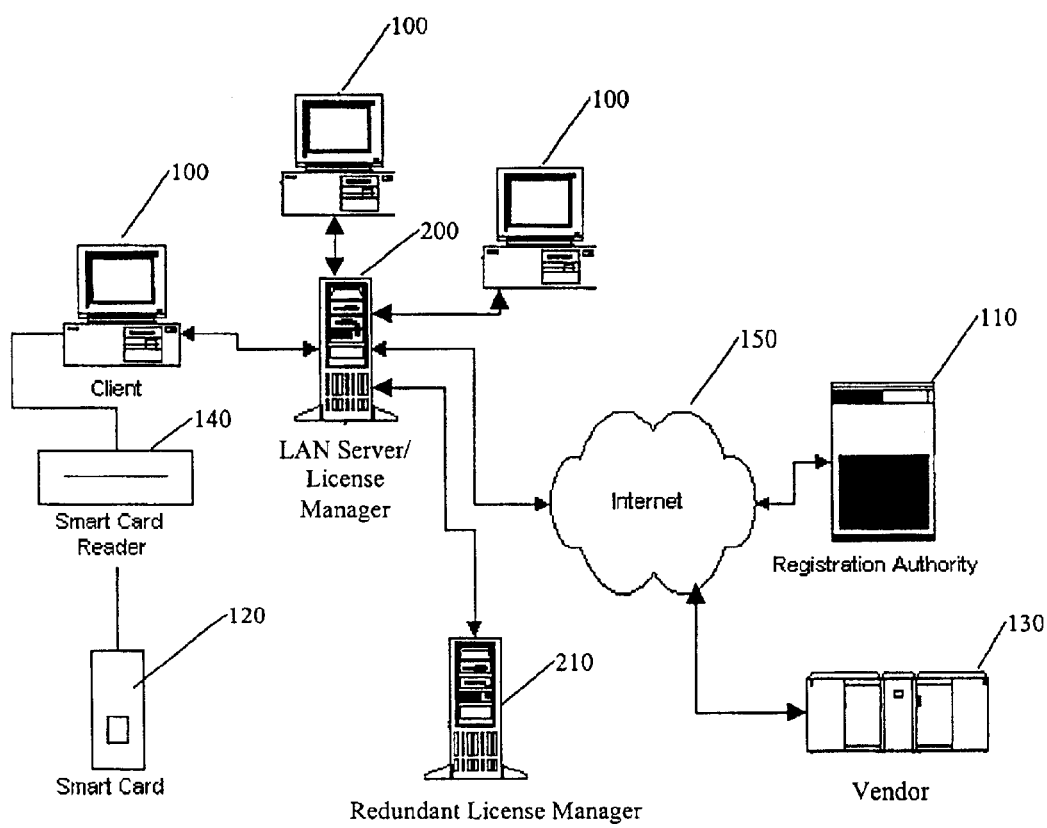
FIG. 5 is a block diagram of a system for protecting licensed electronic data used by a client computer network.

As shown in FIG. 5, the software may be licensed to the user pursuant to a site license, which allows a number of users at the license's location to use the software. A site license is typically purchased by a company that has a number of users connected to a local area network (LAN). In a site license configuration, the client program communicates with a licensing manager 200 provided on a server in the user's LAN. The licensing manager 200, in turn, communicates with the registration authority 110 over the Internet 150. A redundant licensing manager 210 may be provided for increased reliability.

In addition to the communication between the client program on the client computer 100 and the licensing medium 120 and registration authority 110 described above, the protection system also employs communication between the licensing medium 120 and the software.

The software includes application programming interfaces (APIs) that allow the software to periodically access the smart card to ensure that it is installed in the reader. The software also reads the licensing information contained on the smart card to ensure that the user's license is valid and has not expired or been revoked. If the software determines that the user does not have a valid license, then the software may suspend or halt operation, notify the user of the situation, give the user an opportunity to rectify the situation, and/or take other steps depending upon instructions included in the software by the vendor.

As discussed above, the user may be required to install a client program provided by the software protection administrator to install and register protected software. This may be done using an installation wizard provided by the software protection administrator, i.e., a program that controls the software installation process. The installation wizard may be included with the vendor's software on a compact disc read-only memory (CD-ROM), or it may already have been installed on the client computer during a prior software installation. The installation wizard installs the client program on the client computer.

Figure 6:
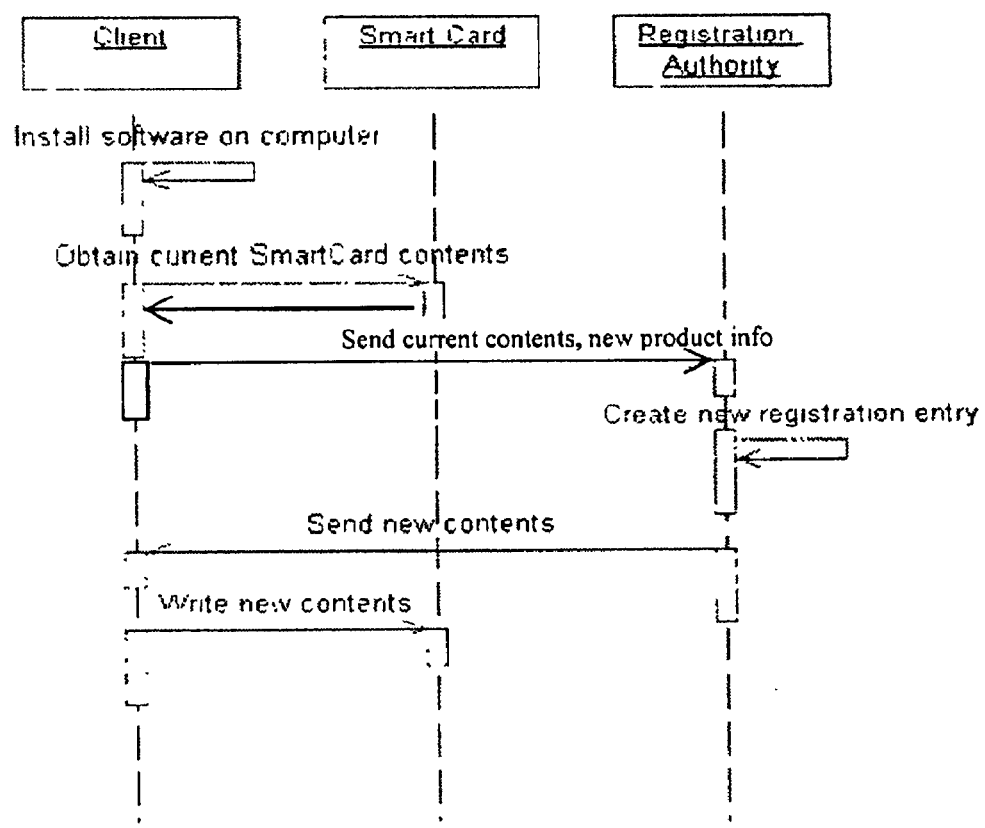
FIG. 6 is a diagram of software registration for a single-user system.

Once the client program has been installed, the installation and registration of protected software proceeds as shown in FIG. 6. The protected software is installed on the client computer, and the user is prompted to register the installed software with the registration authority.

To register the software, the user must insert a smart card into a reader connected to the computer and must have an Internet connection or modem. If these means of connection are not present or if the user does not want to register the software at the time of installation, the user may be permitted to use the software for a limited time in a trial mode in accordance with the vendor's licensing policies.

The client program reads the data from the smart card and transmits it to the registration authority along with a set of registration information. The registration authority first compares the smart card data to corresponding data stored in a database to verify that the smart card is valid. The registration authority then compares the registration information to corresponding data stored in a database to verify that the new software registration is authorized.

The smart card data sent to the registration authority includes a message digest that was generated by a performing a hash function on the smart card data. A hash function takes a data stream of arbitrary length and generates a fixed-length code, which is referred to as the message digest or hash. The registration authority compares the message digest to a corresponding entry in the database to verify that the smart card is valid.

Hash functions having the following properties are generally considered to be cryptographically suitable, i.e., secure. First, the hash function must be essentially a one-way function, so that given a message digest, it is nearly impossible to determine the original data stream. Second, the hash function must produce virtually unique message digests, so that it is nearly impossible to find two messages that produce the same message digest. Commonly used hash functions include: Message Digest 2 (MD2), Message Digest 4 (MD4), Message Digest 5 (MD5), the Secure Hash Algorithm (SHA), and the Secure Hash Algorithm 2 (SHA-2).

The registration information sent to the registration authority includes the unique identifier of the software to be registered. The identifier may be composed of a serial number and a password or passphrase to prevent an unauthorized user from guessing serial numbers. The serial number and password are printed on the CD-ROM case in which the software is distributed. Alternatively, the identifier may be generated from two unrelated components, e.g., two words randomly selected from the dictionary. The registration authority compares the identifier received with the registration information to a database of valid identifiers provided by the software vendor.

The registration information sent to the registration authority also includes other information, such as a product number for the software to be registered, a unique smart card serial number, a smart card sequence number. The registration information also includes expiration periods for the smart card and the software licenses, as further discussed below.

If the registration information is verified by the registration authority, then a new registration entry is created for the newly granted or updated license for the software. The registration authority generates new smart card data reflecting these changes and sends the new data back to the client computer to be stored on the smart card.

The registration authority also sends a hash of the new smart card data to the client computer. The hash is encrypted with a private key belonging to the software protection administrator. The encrypted hash may be decrypted by anyone having a corresponding public key. However, only the software protection administrator can generate such an encrypted hash. In effect, the encrypted hash becomes a digital signature of the software protection administrator.

The private key used by the software protection administrator may be one of a set of private keys, e.g., a set of 100 keys. Using a large set of private keys makes cracking any particular key in the set more difficult, since a different key may be used for each update.

The client program receives the new data and encrypted hash and stores it on the smart card. Each time the smart card is accessed in this manner, the smart card performs a hash comparison using its internal processor to prevent unauthorized changes to the smart card data.

To perform the hash comparison, the smart card processor decrypts the hash received from the registration authority using a public key. The smart card then generates a hash for the new data. The generated hash and the decrypted hash are compared to ensure that the new data came from the registration authority.

The new smart card data sent by the registration authority also includes a new smart card sequence number, a new expiration date for the smart card, software license expiration dates, and software security expiration dates.

The smart card sequence number allows the registration authority to track updates to the smart card. For example, the sequence number may be an n-bit (where n is an integer) word that is incremented each time the smart card is updated. This feature allows the registration authority to detect unauthorized access to the smart card.

The software license expiration date is determined by a configurable time period during which the license is valid based on the license agreement with the user. For example, the software license expiration period may be one hour, one day, thirty days, one year, or any agreed upon period of time.

Each software license may have a corresponding software security expiration date that is determined by a configurable time period within which the user must reconnect to the registration authority to renew the software license. The software security expiration period may be determined by the vendor based on security considerations and may be any desired length of time.

The smart card expiration date is determined by configurable time period during which the smart card will operate. The smart card expiration period may be determined by the software protection administrator based on security or other considerations and may be any desired length of time, e.g., 30 days. The smart card expiration period may be set to be equal to the shortest software security expiration period stored on the card.

The smart card must be updated by the registration authority within the smart card expiration and software security expiration periods for the user to have uninterrupted use of the software. Consequently, if a smart card were lost or stolen, an unauthorized user would only be able to use the smart card for the remainder of the shortest of these expiration periods. In addition, the lost or stolen smart card can be disabled the next time the electronic device communicates with the registration authority.

The new smart card data sent by the registration authority may include an authorization key for the software, for example, a hash of the product expiration date and product number. The authorization key indicates to the smart card that the user is authorized to use the software. Alternatively, if storage space or time are at a premium, a binary flag may be used as an authorization key.

As discussed above, the new data stored on the smart card allows the user to use the software for a configurable time period, e.g., 30 days, as indicated by the software license and software security expiration dates. The software can be used during these time periods without further communication with the registration authority, provided the smart card is present.

The software license expiration period may be used to implement a short term license. For example, a software license may be purchased on a daily basis. In such a case, the user would leave the software installed on the user's computer, but would connect with the registration authority only when the software was needed. Upon connecting to the registration authority, the user would receive new smart card data, which would have a software license expiration period of one day.

To remove a registered software product from a smart card, the user may run a removal program, e.g., a Windows™ control panel applet. The removal program connects to the registration authority, which modifies the database of authorized software licenses. The serial number of the removed software may be returned to a database of authorized serial numbers so that another user may register it, or the serial number may be placed in an inactive status until it is reactivated.

The registration authority sends new smart card data to the user reflecting the removal of the software license. Rather than deleting the entry on the smart card, the registration authority may change the software license expiration date to a date in the past. Consequently, the smart card data would indicate that the product had been licensed to the smart card, but was no longer valid.

During the software registration process, the user will be asked whether to allow automatic updating of the smart card data whenever an Internet connection is detected. If the user allows automatic updates, then a software module, such as a daemon (i.e., a process that runs in the background and performs a specified operation at predefined times or in response to certain events), may be used to continuously monitor for an Internet connection and update the smart card data in the background. Alternatively, a background task initiated by the client program may perform these functions in a manner similar to the Microsoft Critical Update Manager. Automatic updating of the smart card data would allow the user to maintain the maximum software license expiration period, e.g., thirty days, on all of the licensed software.

During an automatic update of the smart card, the smart card data, including the encrypted hash of the smart card data and the sequence number, are transmitted to the registration authority. The smart card data also includes any registered products that have been added to the card since the last update, such as trial use installations. The new product entries also may include new software installations in which the vendor allows temporary registration without connecting to the registration authority. The presence of new products on the smart card may be detected by examining a last-registered field stored on the smart card or a binary field for each registered product.

Upon receiving the smart card data, the registration authority checks a database of verification data to verify that the smart card data is valid. The database may be, for example, a logical database that is stored separately or with other data in another logical or physical database. The registration authority verifies such items as the smart card sequence number and the smart card expiration date. In addition, the encrypted hash of the smart card data is verified by decrypting it using a public key.

Following the verification of the smart card data, the registration authority stores the new smart card data in its database. The registration authority generates new smart card data to update the expiration date and sequence number of the smart card and generates a new encrypted hash of this new smart card data. The new smart card data is stored on the card and an acknowledgement is sent to the registration authority.

As discussed above, if the user does not have an Internet connection or modem or does not want to register the software at the time of installation, the user may be permitted to use the software for a limited time in a trial mode in accordance with the vendor's licensing policy.

If the vendor licensing policy permits trial use, then the client program will be configured to establish a trial use for the user. The client program first checks the installed smart card to determine whether there already is a trial entry for the software in question. A trial entry is made on the smart card when a user is first granted a trial use for the software and is stored on the smart card indefinitely. Accordingly, the client program can determine whether the user has previously been granted a trial use and, if so, the client program may not grant successive trial uses.

When a trial entry is made, a new hash is performed on the new smart card data including the trial entry and stored on the smart card. Consequently, the trial entry cannot be deleted without invalidating the smart card.

If the user has not previously been granted a trial for the software, a trial entry is made on the smart card. The trial entry includes a configurable time limit for the trial use, e.g., 30 days. The user may then use the software for the trial period.

If the user later has access to an internet connection, the trial version may be converted to a full license if the appropriate registration procedures are performed or the registration authority has received authorization from the vendor. As discussed above, the software also may be configured to ask the user whether an automatic upgrade is desired upon detection of an internet connection.

Figure 7:
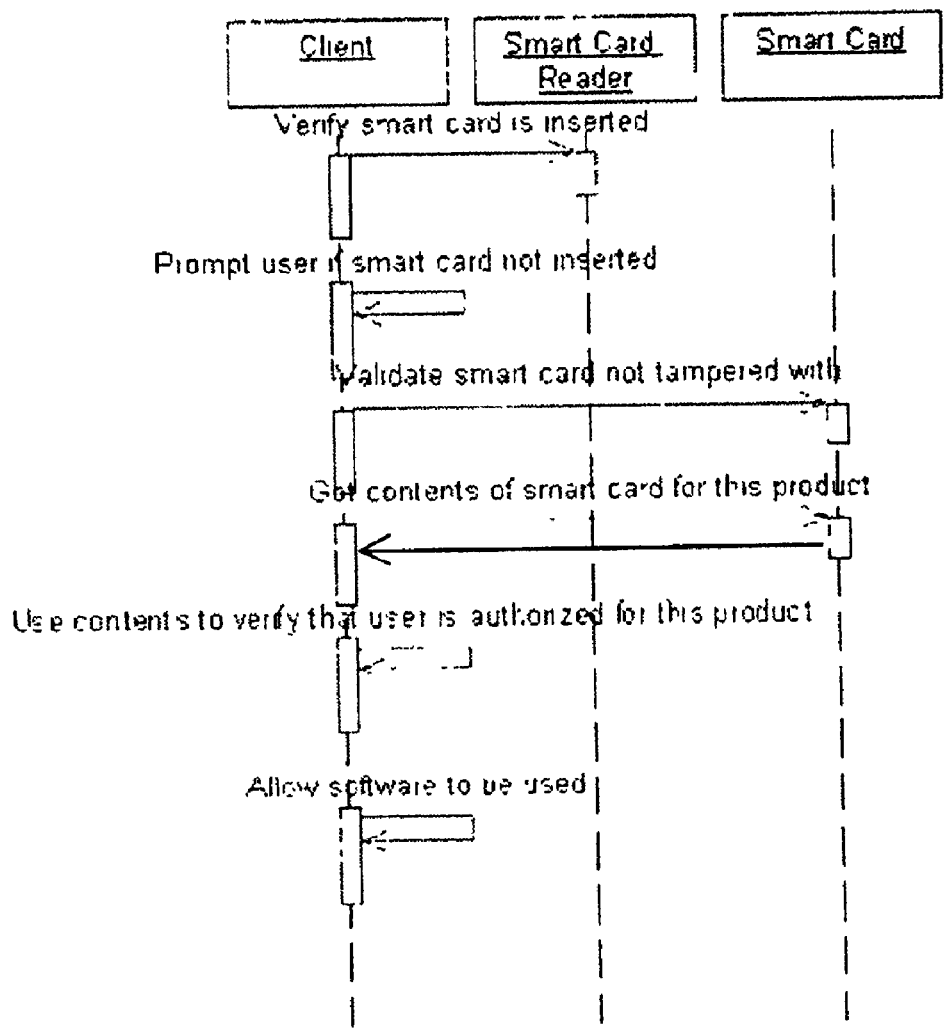
FIG. 7 is a diagram of software startup for a single-user system.

To use the registered software, the user must insert a smart card containing valid license information into the smart card reader of the client computer, i.e., a smart card that has been prepared as described above. As shown in FIG. 7, when the user attempts to activate the software, the client computer checks to see whether a smart card is inserted. If not, the user is prompted to insert the smart card.

The client program reads the contents of the smart card and verifies that it has not been tampered with. The client program then retrieves the licensing information for the particular software. The licensing information allows the client program to determine whether the user is authorized to use the software and that the authorized period of use or trial use has not expired.

The client program may use the encrypted hash to detect whether the smart card has been altered. The client program decrypts the message digest stored on the smart card using a public key. The client program then generates a message digest for the smart card data using a hash function. The client program then compares the generated message digest to the decrypted message digest. If these message digests agree, then the smart card has not been altered. This procedure allows the client program to verify the validity of the smart card without communicating with the registration authority.

Once the verification has been completed, the client program allows the software to be used. During use, the software periodically checks for the presence of a valid smart card using application programming interfaces (APIs) at intervals determined by the software vendor. The APIs are provided by the software protection administrator and may be implemented as dynamically linked libraries (DLLs).

To prevent tampering, the DLLs may be signed so that they can be validated. If it is determined that modules have been tampered with, the software will stop functioning until such modules have been replaced.

Time stamps may be stored on the smart card when it is checked by the APIs. The time stamps are used to prevent a user from resetting the system clock to maintain registration beyond the software license expiration date.

Referring again to FIG. 5, a site license may be purchased by a company to allow software to be used by multiple users on a LAN. The number of users is determined at the time of purchase. The site-license-holder LAN includes a license manager 200, which may also be the server for the LAN.

The license manager 200 acts as an intermediary between the client computers 100 and the registration authority 110. For example, the license manager 200 communicates with the registration authority 110 to register the site license. Typically, the vendor 130 of the site license has transmitted information regarding a new site license to the registration authority 110 prior to registration. The license manager 200 registers the site license by transmitting to the registration authority 110 the serial number/password supplied with the software.

Alternatively, registration may proceed in a manner similar to the single user installation described above. In such a case, the company's license administrator, who is usually the LAN administrator, installs the site-licensed software. An installation wizard installs a license management program that verifies the validity of the inserted smart card 120. The license management program also communicates with the registration authority 110 to verify the contents of the smart card 120 and register the site license.

The license manager 120 maintains a database of all of the site-licensed software installed on the LAN. The site license database is synchronized periodically with a corresponding database at the registration authority 110. The site license database includes information regarding the number of fixed node and floating licenses.

Fixed node licenses are assigned to particular individuals, e.g., an employee of the company that holds the site license. Once the fixed node license is assigned, there is one less license available to the company. The license manager maintains entries in the site license database for each of the assigned fixed node licenses.

Floating licenses allow a fixed number of employees to concurrently use the software. If a employee discontinues use of the software, an additional license becomes available to other employees. The license manager continuously maintains a list of current users to ensure that the number of concurrent users does not exceed the total number of floating licenses.

Figure 8:
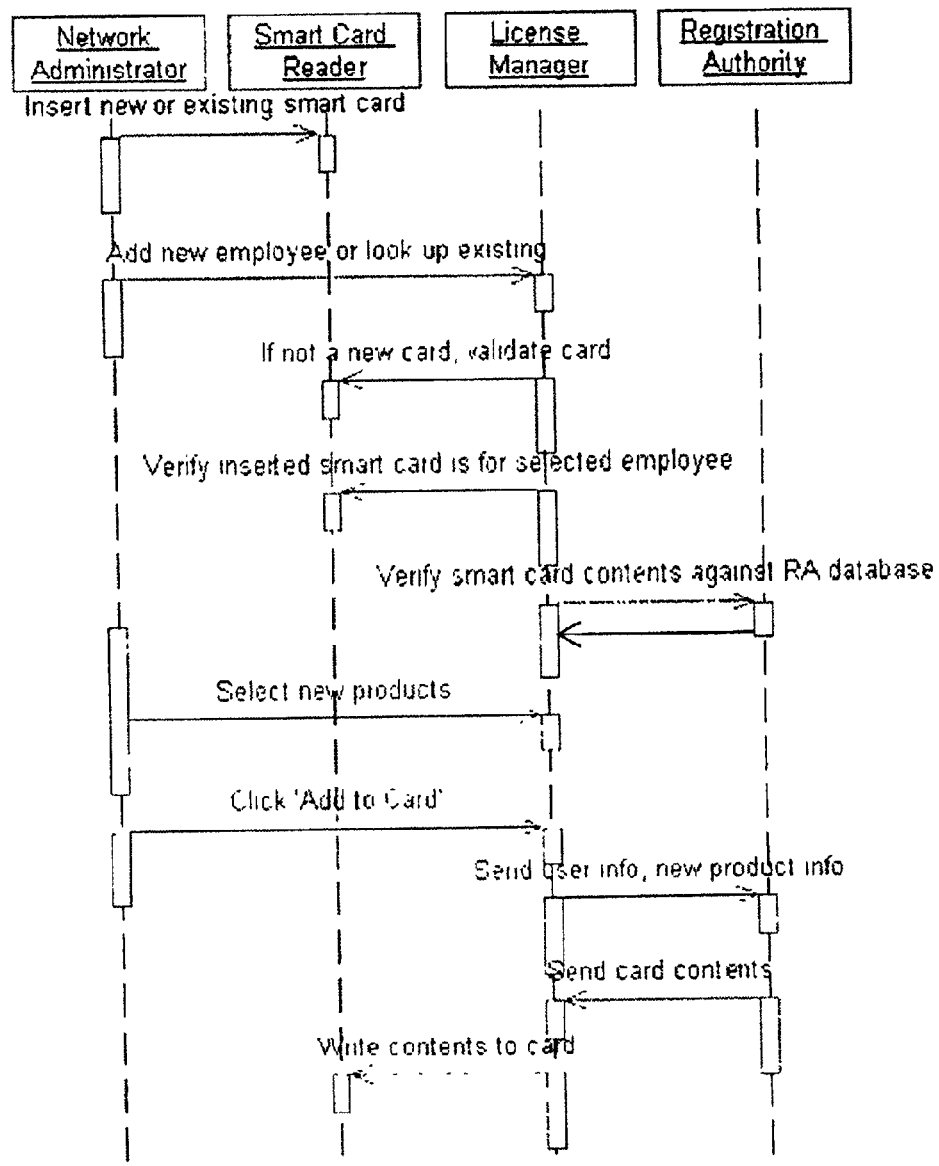
FIG. 8 is a diagram of adding a software license to an employee smart card in a multiple-user system.

As described above, the license manager 200 communicates with the registration authority 110 to register the site-licensed software and maintains the site license database. In addition, as shown in FIG. 8, the license manager is used by the company's license administrator to create and modify smart cards that are issued to each employee. The smart cards are programmed with encrypted licensing information indicating which site-licensed software the employee is authorized to access.

The license administrator inserts a new or existing smart card 120 into a smart card reader 140 connected to the license administrator's computer 100, which is connected to the LAN server/License manager 200. The license administrator's computer 100 communicates with the license manager 200 to look up the corresponding stored data or add a new entry.

If the smart card 120 is for a selected existing employee, the license manager 200 will verify the contents of the smart card 120 and verify that the smart card 120 belongs to the selected employee. The license manager 200 then communicates with the registration authority 110 to verify the validity of the smart card 120 using corresponding data stored in the registration authority database.

Once the validity of the smart card 120 has been verified, the license administrator may select new licenses from the available site licenses to add to the employee's card 120. The license manager 200 generates new licensing information for the smart card 120 and transmits it to the registration authority 110. The registration authority 110 sends back new contents for the smart card 120, which are written on the card 120 by the smart card reader 140.

Figure 9:
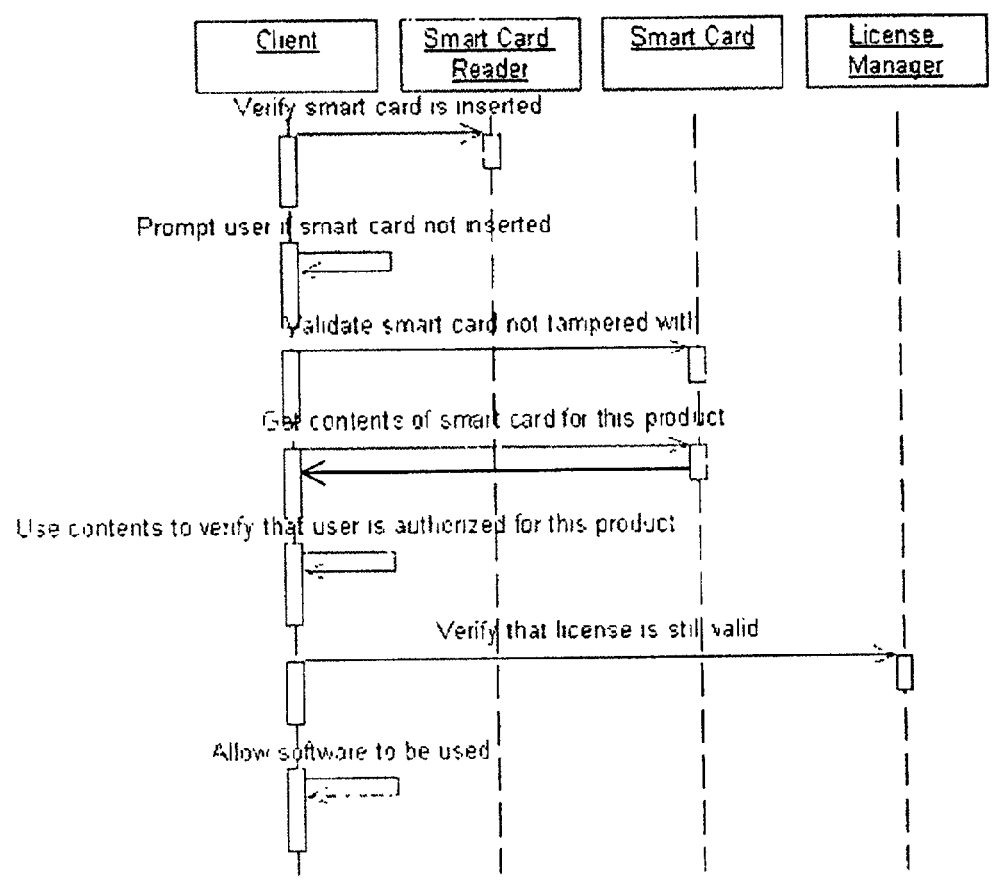
FIG. 9 is a diagram of software startup for a fixed-node license in a multiple-user system.

To use the registered software, the user must insert a smart card 120 containing valid license information into the smart card reader 140 of the client computer 100, i.e., a smart card that has been prepared as described above. As shown in FIG. 9, when a user having a fixed-node site license attempts to activate the software, the client computer 100 checks to see whether a smart card 120 is inserted. If not, the user is prompted to insert the smart card 120.

The client program on the client computer 100 reads and verifies the validity of the smart card 120 to ensure that it has not been tampered with. The verification process is described in further detail below. The client program then retrieves the licensing information for the particular software. The licensing information allows the client program to verify that the user is authorized to use the software and that the authorized period of use or trial use has not expired.

The client program on the client computer 100 then communicates with the license manager 200 to verify that the user has a valid fixed-node license. If the user does not have a fixed-node license entry in the site license database stored by the license manager 200, the license manager 200 may check for an available floating license, as discussed in further detail below. If neither a fixed-node nor floating license is available, the user will not be verified. This configuration allows the license manager 200 to control the assignment of fixed-node licenses without connecting to the registration authority 110.

Once the verification has been completed, the client program allows the software to be used. During use, the software may periodically reverify the smart card using APIs at intervals determined by the software vendor.

Figure 10:
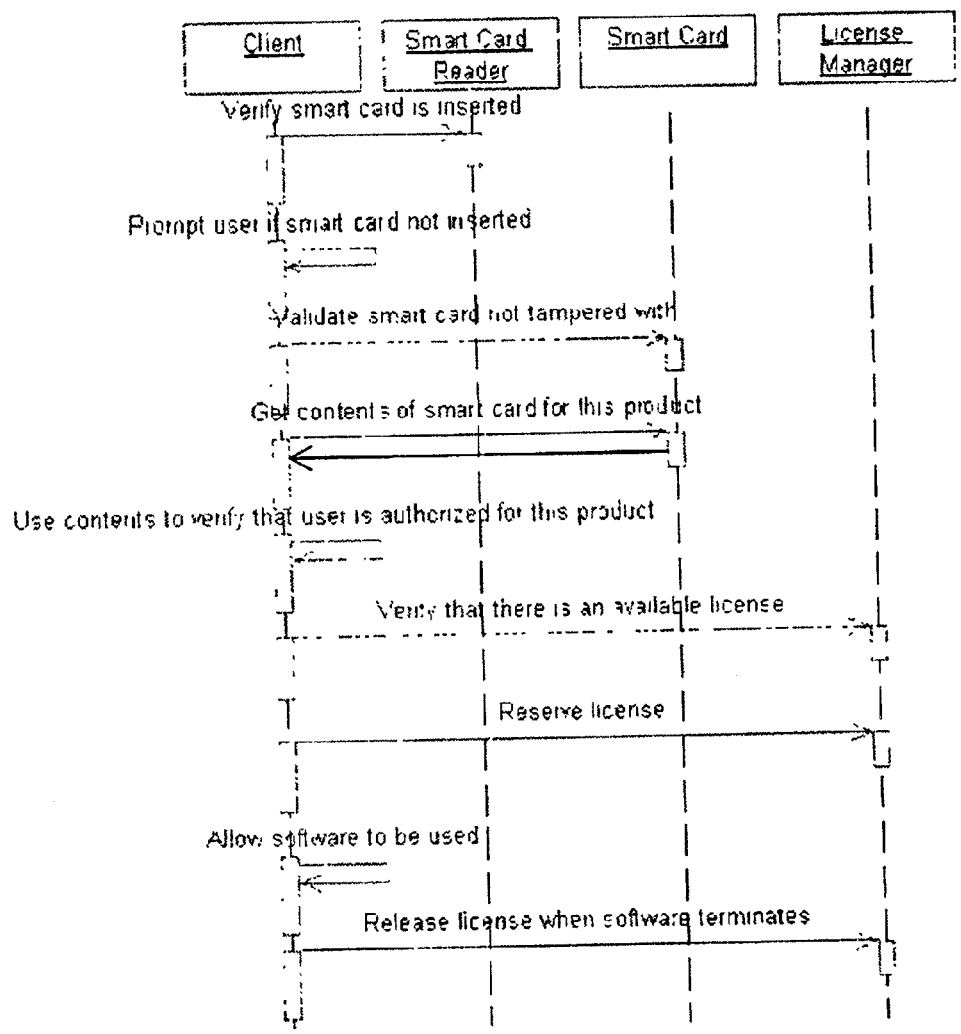
FIG. 10 is a diagram of software startup for a floating license in a multiple-user system.

Similarly, as shown in FIG. 10, when a user having a floating site license attempts to activate the software, the client computer 100 checks to see whether a smart card 120 is inserted. If not, the user is prompted to insert the smart card 120.

The client program on the client computer 100 reads and verifies the validity of the contents of the smart card 120 to ensure that it has not been tampered with. The client program then retrieves the licensing information for the particular software.

The client program on the client computer 100 then communicates with the license manager 200 to determine whether a floating license is available. If a floating license is available, it will be reserved for the user, i.e., the number of available licenses will be decreased by one. This configuration allows the license manager 200 to control the assignment of floating licenses without connecting to the registration authority 110.

Once the verification has been completed, the client program allows the software to be used. During use, the software may periodically reverify the smart card using APIs at intervals determined by the software vendor. When the user terminates the software, the client computer will allow the license manager to release the floating license to other users.

An employee may wish to use registered software on a computer that is not connected to the LAN, e.g., a laptop or home computer. In such a case, the client program would not be able to communicate with the license manager to verify that the user has a valid fixed-node license or that a floating license is available, as discussed above. The employee's smart card therefore must be modified by the license manager to allow offsite use of the registered software.

For a fixed-node license, the license manager creates an entry on the employee's smart card that allows use of the software for a license period, e.g., 30 days. During this period, the employee may use the software without connecting to the license manager for verification.

For a floating license, the license manager creates an entry on the employee's smart card that allows use of the software for a license period, e.g., 30 days, and reserves a floating license. During this period, the employee may use the software without connecting to the license manager for verification. However, other employees will not be able to access the reserved floating license during this period regardless of whether the floating license is actually being used by the off-site employee.

The employee may connect to the LAN while off-site, for example, to check for email. Upon connecting to the LAN, the license manager may automatically update the employee's smart card to restart the license period. Hence, if an employee checks more frequently than the license period, the software may be used off-site indefinitely.

When a user acquires a new smart card, it must be registered with the registration authority before licensing information is stored on it. The registration is done using a registration wizard installed on the client computer.

The registration wizard may be installed automatically during installation of the first protected software product in a manner similar to the installation of the client program discussed above. Alternatively, the registration wizard may be downloaded from the Internet, bundled with a smart card reader, or included in the operating system.

During registration of the smart card, the registration wizard prompts the user to enter a number of questions and answers that most likely are known only to the user. These questions and answers are encrypted using a private key and sent to the registration authority along with the card serial number. This information may be used during software registration and use to verify that the user is the actual owner of the smart card.

The smart card serial number may be stored on the client computer, e.g., in the registry. If the user forgets or loses the serial number, the user can run an applet to retrieve smart card serial numbers from the registry. The applet also may indicate the software products that are registered on the smart card.

The user will be instructed to keep the smart card serial number in a safe place to facilitate replacement if the card is lost, damaged, or stolen. If the user does not known the serial number of the smart card or does not have access to the client computer, the user may contact the vendor of one of the software products licensed to the smart card. The vendor can provide the serial number of the software, which can be used by the registration authority to look up the smart card serial number.

If a smart card is lost, damaged, or stolen, the user may call a toll-free number or use the Internet to submit the necessary information to the registration authority or the vendor to have the licenses stored on the old card, including trial licenses, transferred to a new card. The old card then is disabled in the registration authority database.

If an unauthorized user attempts to renew licenses on the old smart card by connecting to the registration authority, the old smart card will be disabled. If it is determined that the old smart card was issued recently, the licensing period for the software products may be shortened on the new smart card to prevent repeated smart card replacement.

It will be appreciated that each of these embodiments discussed above provides a novel system and method for preventing unauthorized access to electronic data that achieves the above discussed objects of the present invention.

It also will be appreciated that because the licensing medium can include licenses from multiple vendors, the system enables a user to access data from multiple vendors without the need for multiple keys or access devices.

It also will be appreciated that because the licensing medium is associated with a particular user, rather than a particular electronic device, the user can access the licensed electronic data using a number of different electronic devices, e.g., on a home computer and a laptop.

It also will be appreciated that because the licensing medium can store license data for electronic data from a number of vendors, the user may conveniently access all of the data for which the user is licensed using a single licensing medium.

It also will be appreciated that because the licensing medium is portable, the system may be used on any computer capable of reading the licensing medium. Hence, the protected electronic data may be accessed by the holder of the licensing medium on a home computer, laptop computer, handheld computer, etc.

It also will be appreciated that because the licensing medium permits access to the protected electronic data for a configurable time period, the user may access the data without connecting to the registration authority during the time period. Consequently, a fixed connection to the registration authority or the Internet is not required.

It also will be appreciated that because the licensing medium permits access to the protected electronic data for a configurable time period, the vendor may offer short term licenses, e.g., weekly, daily, hourly, etc.

It will also be appreciated that because a smart card has an internal processor, it can perform encryption, decryption, and hash functions. Consequently, the smart card can decrypt a received hash and compare it to an internally generated hash of the smart card data. This comparison allows the smart card to determine whether new data received is from an authorized source and thereby prevent unauthorized modification of the smart card data.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed:

1. A system for preventing unauthorized access to electronic data on an electronic device, the system comprising:
a portable licensing medium configured to communicate with the electronic device and to store license data, the license data configured to be used by the electronic device to determine whether to allow access to the electronic data; and
a registration authority configured to communicate with the electronic device, the registration authority having verification data for verifying the license data stored on the licensing medium,
wherein the registration authority provides updated license data for the licensing medium.

2. A system according to claim 1, wherein the electronic device is configured to verify validity of the licensing medium by comparing the license data to the verification data.

3. A system according to claim 1, wherein the licensing medium is configured to store a license data message digest produced by performing a hash of the license data.

4. A system according to claim 3, wherein the verification data comprises a copy of the license data message digest.

5. A system according to claim 4, wherein the electronic device is configured to verify validity of the licensing medium by comparing the license data message digest to the copy of the license data message digest in the verification data.

6. A system according to claim 3, wherein the license data message digest is encrypted with a private key associated with the registration authority.

7. A system according to claim 6, wherein the private key is one of a plurality of private keys associated with the registration authority.

8. A system according to claim 6, wherein the verification data comprises a copy of the encrypted license data message digest.

9. A system according to claim 8, wherein the electronic device is configured to verify validity of the licensing medium by comparing the encrypted license data message digest to the copy of the encrypted license data message digest in the verification data.

10. A system according to claim 6, wherein the electronic device is configured to verify validity of the licensing medium by:
decrypting the license data message digest read from the licensing medium using a public key associated with the registration authority;
generating a message digest by performing a hash on the license data read from the licensing medium; and
comparing the decrypted message digest to the generated message digest.

11. A system according to claim 1, wherein the electronic device is configured to send registration information to the registration authority.

12. A system according to claim 11, wherein the registration information comprises a random identifier associated with the electronic data.

13. A system according to claim 12, wherein the verification data comprises a list of authorized identifiers that allow access to the electronic data.

14. A system according to claim 13, wherein the registration authority is configured to provide updated license data to the licensing medium when the identifier sent with the registration information corresponds to one of the authorized identifiers.

15. A system according to claim 1, wherein the licensing medium comprises a smart card having a memory.

16. A system according to claim 15, wherein the smart card has a microprocessor.

17. A system according to claim 15, wherein the smart card is configured to decrypt a first message digest received from the registration authority using a public key associated with the registration authority, to generate a second message digest by performing a hash on updated license data received from the registration authority, and to compare the first message digest to the second message digest.

18. A system according to claim 15, wherein the license data comprises a sequence number that allows the registration authority a number of times the smart card has been accessed.

19. A system according to claim 1, wherein the licensing medium is a memory stick.

20. A system according to claim 1, wherein the licensing medium is a random access memory.

21. A system according to claim 1, wherein the licensing medium comprises a memory installed in a cellular telephone.

22. A system according to claim 21, wherein the licensing medium is not removable from the cellular telephone.

23. A system according to claim 1, wherein the licensing medium is a computer disk.

24. A system according to claim 23, wherein the computer disk is an optical disk.

25. A system according to claim 23, wherein the computer disk is a magnetic disk.

26. A system according to claim 23, wherein the computer disk is an electronic disk.

27. A system according to claim 1, wherein the license data comprises a licensing medium expiration date determined by a configurable time period during which the licensing medium is valid.

28. A system according to claim 1, wherein the license data comprises a software license expiration date determined by a configurable time period during which access to the electronic data is allowed.

29. A system according to claims 27 or 28, wherein the licensing medium expiration period is set to a shortest software license expiration period of the license data.

30. A system according to claim 1, wherein the license data comprises a software security expiration date determined by a configurable time period during which access to the electronic data is allowed.

31. A system according to claim 1, wherein the licensing medium is configured to communicate with the electronic device through a wired connection.

32. A system according to claim 1, wherein the licensing medium is configured to communicate with the electronic device through a wireless connection.

33. A system according to claim 1, wherein the licensing medium is configured to communicate with the electronic device through a network.

34. A system according to claim 33, wherein the network is the Internet.

35. A system for preventing unauthorized access to electronic data on an electronic device, the system comprising:
license data storage means configured to communicate with the electronic device, the license data configured to be used by the electronic device to determine whether to allow access to the electronic data; and registration authorization means configured to communicate with the electronic device, the registration authorization means having verification means for verifying the license data stored on the licensing medium, wherein the registration authorization means is configured to provide updated license data to the license data storage means.

36. A system for preventing unauthorized access to electronic data on an electronic device, the system comprising:

a smart card configured to communicate with the electronic device and configured to store license data, the license data configured to be used by the electronic device to determine whether to allow access to the electronic data; and a registration server configured to communicate with the electronic device, the registration server having verification data for verifying the license data stored on the smart card, wherein the registration server is configured to provide updated license data to the smart card.

37. A registration authority for preventing unauthorized access to electronic data on an electronic device, the registration authority comprising:

means for communicating with the electronic device; and verification data for verifying license data stored on a portable licensing medium that is configured to communicate with the electronic device, wherein the license data is used by the electronic device to determine whether to allow access to the electronic data, and the registration authority is configured to provide updated license data to the licensing medium.

38. A smart card for preventing unauthorized access to electronic data on an electronic device, the smart card comprising:

means for communicating with the electronic device;

a memory for storing data received from the communicating means; and license data stored in the memory, the license data being configured to be used by the electronic device to determine whether to allow access to the electronic data, wherein the license data has been verified by verification data stored on a registration server that is configured to communicate to the electronic device, and the smart card is configured to receive provide updated license data from the registration server.

39. A system for preventing unauthorized access to electronic data on an electronic device, the system comprising:

a portable licensing medium configured to communicate with the electronic device and configured to store license data, the license data is configured to be used to determine whether to allow access to the electronic data;

a registration authority having a first verification database for verifying license data stored in a second verification database; and a license manager configured to communicate with the electronic device and the registration authority, the license manager having the second verification database for verifying the license data stored on the licensing medium, wherein the registration authority is configured to provide updated verification data for the second verification database of the license manager, and the license manager is configured to provide updated license data to the licensing medium.

40. A system according to claim 39, wherein the electronic device is configured to verify validity of the licensing medium by comparing the license data to the second verification database.

41. A system according to claim 39, wherein the license manager is configured to verify validity of the second verification database by comparing it to the first verification database.

42. A system according to claim 39, wherein the licensing medium is configured to store a license data message digest produced by performing a hash of the license data.

43. A system according to claim 42, wherein the second verification database comprises a copy of the license data message digest.

44. A system according to claim 43, wherein the electronic device is configured to verify validity of the licensing medium by comparing the license data message digest to the copy of the license data message digest in the second verification database.

45. A system according to claim 42, wherein the license data message digest is encrypted with a private key associated with the registration authority or the license manager.

46. A system according to claim 45, wherein the private key is one of a plurality of private keys associated with the registration authority or the license manager.

47. A system according to claim 45, wherein the second verification database comprises a copy of the encrypted license data message digest.

48. A system according to claim 47, wherein the electronic device is configured to verify validity of the licensing medium by comparing the encrypted license data message digest to the copy of the encrypted license data message digest in the second verification database.

49. A system according to claim 47, wherein the electronic device is configured to verify validity of the licensing medium by:

decrypting the license data message digest read from the licensing medium using a public key associated with the registration authority;

generating a message digest by performing a hash on the license data read from the licensing medium; and comparing the decrypted message digest to the generated message digest.

50. A system according to claim 39, wherein the license manager is configured to send site license registration information to the registration authority.

51. A system according to claim 50, wherein the site license registration information comprises a random identifier associated with the electronic data.

52. A system according to claim 51, wherein the first verification database comprises a list of authorized identifiers that allow access to the electronic data.

53. A system according to claim 52, wherein the registration authority is configured to provide updated verification data to the license manager when the identifier sent with the registration information corresponds to one of the authorized identifiers.

54. A system according to claim 39, wherein the license manager is configured to communicate with the registration authority to verify that the second verification database corresponds to the first verification database.

55. A system according to claim 39, wherein the license data comprises a licensing medium expiration date determined by a configurable time period during which the licensing medium is valid.

56. A system according to claim 39, wherein the license data comprises a software license expiration date determined by a configurable time period during which access to the electronic data is allowed.

57. A system according to claims 55 and 56, wherein the licensing medium expiration period is set to a shortest software license expiration period of the license data.

58. A system according to claim 39, wherein the license data comprises a software security expiration date determined by a configurable time period during which access to the electronic data is allowed.

59. A system according to claim 39, wherein the licensing medium is configured to communicate with the electronic device through a wired connection.

60. A system according to claim 39, wherein the licensing medium is configured to communicate with the electronic device through a wireless connection.

61. A system according to claim 39, wherein the licensing medium is configured to communicate with the electronic device through a network.

62. A system according to claim 61, wherein the network is the Internet.

63. A system for preventing unauthorized access to electronic data on an electronic device, the system comprising:

license data storage means configured to communicate with the electronic device, the license data being used to determine whether to allow access to the electronic data;

registration authorization means having a first verification means for verifying license data provided by a second verification means; and license management means configured to communicate with the electronic device and the registration authorization means, the license management means having the second verification means for verifying the license data stored on the license data storage means, wherein the registration authorization means is configured to provide updated verification data for the second verification database of the license management means, and the license management means is configured to provide updated license data to the license data storage means.

64. A system for preventing unauthorized access to electronic data on an electronic device, the system comprising:

a smart card configured to communicate with the electronic device and configured to store license data, the license data being used to determine whether to allow access to the electronic data;

a registration server having a first verification database for verifying license data stored in a second verification database; and a license management server configured to communicate with the electronic device and the registration server, the license management server having the second verification database for verifying the license data stored on the smart card, wherein the registration server is configured to provide updated verification data for the second verification database of the license manager server, and the license management server is configured to provide updated license data to the smart card.

65. A registration authority for preventing unauthorized access to electronic data on an electronic device, the registration authority comprising:

means for communicating with the license manager; and a first verification database for verifying license data stored in a second verification database on a license manager that is configured to communicate with the electronic device, wherein the second verification database is configured to verify license data stored on a portable licensing medium that is configured to communicate with the electronic device, the license data is configured to be used to determine whether to allow access to the electronic data, and the registration authority is configured to provide updated verification data to the second verification database of the license manager.

66. A smart card for preventing unauthorized access to electronic data on an electronic device, the smart card comprising:

means for communicating with the electronic device;

a memory for storing data received from the communicating means; and license data stored in the memory, the license data being configured to be used by the electronic device to determine whether to allow access to the electronic data, wherein the license data has been verified by a license management verification database stored on a license management server configured to communicate with the electronic device and a registration server, and the license management verification database has been verified by a registration database stored on the registration server, and the smart card is configured to receive updated license data from the license management server.

67. A method for preventing unauthorized access to electronic data stored on an electronic device, the method comprising the steps of:

storing license data on a portable licensing medium configured to communicate with the electronic device;

determining whether to allow access to the electronic data based on the license data;

verifying the license data stored on the licensing medium using a registration authority having verification data and being configured to communicate with the electronic device; and providing updated license data to the licensing medium using the registration authority.

68. A method according to claim 67, wherein during the verifying step, the electronic device compares the license data stored on the licensing medium to the verification data.

69. A method according to claim 67, wherein the licensing medium stores a license data message digest produced by performing a hash of the license data.

70. A method according to claim 69, wherein the verification data comprises a copy of the license data message digest.

71. A method according to claim 70, wherein in the verifying step, the electronic device compares the license data message digest stored on the licensing medium to the copy of the license data message digest in the verification data.

72. A method according to claim 69, wherein the license data message digest is encrypted with a private key associated with the registration authority.

73. A method according to claim 72, wherein the private key is one of a plurality of private keys associated with the registration authority.

74. A method according to claim 72, wherein the verification data comprises a copy of the encrypted license data message digest.

75. A method according to claim 74, wherein in the verifying step, the electronic device compares the encrypted license data message digest stored on the licensing medium to the copy of the encrypted license data message digest in the verification data.

76. A method according to claim 72, further comprising the steps of:
reading the encrypted license data message digest from the licensing medium using the electronic device;
decrypting the license data message digest using a public key associated with the registration authority;
generating a message digest by performing a hash on the license data read from the licensing medium; and
comparing the decrypted message digest to the generated message digest.

77. A method according to claim 67, further comprising the step of sending registration information to the registration authority using the electronic device.

78. A method according to claim 77, wherein the registration information comprises a random identifier associated with the electronic data.

79. A method according to claim 78, wherein the verification data comprises a list of authorized identifiers that allow access to the electronic data.

80. A method according to claim 79, wherein the registration authority provides updated license data to the licensing medium when the identifier sent with the registration information corresponds to one of the authorized identifiers.

81. A method according to claim 67, wherein the licensing medium comprises a smart card having a microprocessor and memory.

82. A method according to claim 81, wherein the smart card performs the steps of:
decrypting a first message digest received from the registration authority using a public key associated with the registration authority;
generating a second message digest by performing a hash on updated license data received from the registration authority; and
comparing the first message digest to the second message digest.

83. A method according to claim 67, wherein the license data comprises a licensing medium expiration date determined by a configurable time period during which the licensing medium is valid.

84. A method according to claim 67, wherein the license data comprises a software license expiration date determined by a configurable time period during which access to the electronic data is allowed.

85. A method according to claims 83 or 84, wherein the licensing medium expiration period is set to a shortest software license expiration period of the license data.

86. A method according to claim 67, wherein the license data comprises a software security expiration date determined by a configurable time period during which access to the electronic data is allowed.

87. A method for preventing unauthorized access to electronic data stored on an electronic device, the method comprising the steps of:
storing license data on a portable licensing medium configured to communicate with the electronic device;
determining whether to allow access to the electronic data based on the license data;
verifying, using a registration authority having a first verification database, the license data stored in a second verification database;
verifying the license data stored on the licensing medium using a license manager having the second verification database and being configured to communicate with the electronic device and the registration authority;
providing, using the registration authority, updated verification data for the second verification database of the license manager; and
providing license data to the licensing medium using the license manager.

88. A method according to claim 87, wherein the electronic device verifies validity of the licensing medium by comparing the license data to the second verification database.

89. A method according to claim 87, wherein the license manager verifies the validity of the second verification database by comparing it to the first verification database.

90. A method according to claim 87, wherein the licensing medium stores a license data message digest produced by performing a hash of the license data.

91. A method according to claim 90, wherein the second verification database comprises a copy of the license data message digest.

92. A method according to claim 91, wherein the electronic device verifies validity of the licensing medium by comparing the license data message digest to the copy of the license data message digest in the second verification database.

93. A method according to claim 90, wherein the license data message digest is encrypted with a private key associated with the registration authority or the license manager.

94. A method according to claim 93, wherein the private key is one of a plurality of private keys associated with the registration authority or the license manager.

95. A method according to claim 93, wherein the second verification database comprises a copy of the encrypted license data message digest.

96. A method according to claim 95, wherein the electronic device verifies validity of the licensing medium by comparing the encrypted license data message digest to the copy of the encrypted license data message digest in the second verification database.

97. A method according to claim 95, wherein the electronic device verifies validity of the licensing medium by:
decrypting the license data message digest read from the licensing medium using a public key associated with the registration authority;
generating a message digest by performing a hash on the license data read from the licensing medium; and
comparing the decrypted message digest to the generated message digest.

98. A method according to claim 87, wherein the license manager sends site license registration information to the registration authority.

99. A method according to claim 98, wherein the site license registration information comprises a random identifier associated with the electronic data.

100. A method according to claim 99, wherein the first verification database comprises a list of authorized identifiers that allow access to the electronic data.

101. A method according to claim 100, wherein the registration authority provides updated verification data to the license manager when the identifier sent with the registration information corresponds to one of the authorized identifiers.

102. A method according to claim 87, wherein the license manager communicates with the registration authority to verify that the second verification database corresponds to the first verification database.

103. A method according to claim 87, wherein the license data comprises a licensing medium expiration date determined by a configurable time period during which the licensing medium is valid.

104. A method according to claim 87, wherein the license data comprises a software license expiration date determined by a configurable time period during which access to the electronic data is allowed.

105. A method according to claims 103 and 104, wherein the licensing medium expiration period is set to a shortest software license expiration period of the license data.

106. A method according to claim 87, wherein the license data comprises a software security expiration date determined by a configurable time period during which access to the electronic data is allowed.

107. Computer code executable on an electronic device to prevent unauthorized access to electronic data stored on the electronic device, the computer code comprising:
  code for storing license data on a portable licensing medium configured to communicate with the electronic device;
  code for determining whether to allow access to the electronic data based on the license data;
  code for verifying the license data stored on the licensing medium by communicating with a registration authority having verification data; and
  code for providing updated license data received from the registration authority to the licensing medium.

108. A computer program executable on an electronic device to provide access to electronic data stored on the electronic device, the computer program comprising:
  code for providing access to the electronic data; and
  a subprogram for preventing unauthorized access to the electronic data, the subprogram including:
    code for storing license data on a portable licensing medium configured to communicate with the electronic device,
    code for determining whether to allow access to the electronic data based on the license data,
    code for verifying the license data stored on the licensing medium by communicating with a registration authority having verification data, and
    code for providing updated license data received from the registration authority to the licensing medium.

109. Computer code executable on an electronic device to prevent unauthorized access to electronic data stored on the electronic device, the computer code comprising:
  code for storing license data on a portable licensing medium configured to communicate with the electronic device;
  code for determining whether to allow access to the electronic data based on the license data;
  code for verifying, by communicating with a registration authority having a first verification database, the license data stored in a second verification database;
  code for verifying the license data stored on the licensing medium by communicating with a license manager having the second verification database and being configured to communicate with the electronic device and the registration authority;
  code for providing updated verification data received from the registration authority to the second verification database of the license manager; and
  code for providing license data received from the license manager to the licensing medium.

110. A computer program executable on an electronic device to provide access to electronic data stored on the electronic device, the computer program comprising:
  code for providing access to the electronic data; and
  a subprogram for preventing unauthorized access to the electronic data, the subprogram including:
    code for storing license data on a portable licensing medium configured to communicate with the electronic device,
    code for determining whether to allow access to the electronic data based on the license data,
    code for verifying, by communicating with a registration authority having a first verification database, the license data stored in a second verification database,
    code for verifying the license data stored on the licensing medium by communicating with a license manager having the second verification database and being configured to communicate with the electronic device and the registration authority,
    code for providing updated verification data received from the registration authority to the second verification database of the license manager, and
    code for providing license data received from the license manager to the licensing medium.

111. A method for using a smart card to gain access to protected electronic data on an electronic device, the method comprising the steps of:
  transmitting license data stored on the smart card to the electronic device; and
  using the electronic device to determine, based on the license data, whether access to the electronic data will be allowed,
  wherein the smart card is configured to store updated license data received from the electronic device or from a remote device.

112. A method for using a smart card to gain access to protected electronic data on an electronic device, the method comprising the steps of:
  transmitting license data stored on the smart card to the electronic device;
  using the electronic device to determine, based on the license data, whether access to the electronic data will be allowed;
  communicating, if access to the electronic data is not allowed, with a registration authority having verification data to verify and/or update the license data stored on the smart card; and
  storing on the smart card updated license data received from the registration authority.

113. A method for using a smart card to gain access to protected electronic data on an electronic device, the method comprising the steps of:
  transmitting license data stored on the smart card to a registration authority having verification data to verify the license data; and
  receiving from the registration authority a determination of whether access to the electronic data will be allowed,
  wherein the smart card is configured to store updated license data received from the registration authority.

* * * * *

(12) INTER PARTES REVIEW CERTIFICATE (137th)
United States Patent
Edelman

(10) Number: US 6,857,067 K1
(45) Certificate Issued: May 18, 2016

(54) SYSTEM AND METHOD FOR PREVENTING UNAUTHORIZED ACCESS TO ELECTRONIC DATA

(75) Inventor: Martin S. Edelman

(73) Assignee: UNILOC LUXEMBOURG S. A.

Trial Number:

IPR2013-00391 filed Jun. 28, 2013

Petitioners: Distinctive Developments, Ltd.; Electronic Arts Inc.; Gameloft S.E.; Halfbrick Studios Pty Ltd.; Laminar Research LLC; Mojang AB; Square Enix, Inc.

Patent Owners: Uniloc USA, Inc.; Uniloc Luxembourg S. A.

Inter Partes Review Certificate for:

Patent No.: 6,857,067
Issued: Feb. 15, 2005
Appl. No.: 09/792,045
Filed: Feb. 26, 2001

The results of IPR2013-00391 are reflected in this inter partes review certificate under 35 U.S.C. 318(b).

INTER PARTES REVIEW CERTIFICATE
U.S. Patent 6,857,067 K1
Trial No. IPR2013-00391
Certificate Issued May 18, 2016

AS A RESULT OF THE INTER PARTES REVIEW PROCEEDING, IT HAS BEEN DETERMINED THAT:

Claims 21 and 22 are found patentable.

Claims 1, 20, 30, 31, 67, 107 and 108 are cancelled.

\* \* \* \* \*